US012586772B2

(12) United States Patent
Byun et al.

(10) Patent No.: US 12,586,772 B2
(45) Date of Patent: Mar. 24, 2026

(54) LIGHT EMITTING PLASMA LAMP BULB FOR SOLAR UV SIMULATION AND LAMP COMPRISING THE SAME

(71) Applicant: KOREA RESEARCH INSTITUTE OF CHEMICAL TECHNOLOGY, Daejeon (KR)

(72) Inventors: Doo Jin Byun, Daejeon (KR); Min Jae Yoo, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 347 days.

(21) Appl. No.: 18/450,756

(22) Filed: Aug. 16, 2023

(65) Prior Publication Data

US 2024/0063011 A1 Feb. 22, 2024

(30) Foreign Application Priority Data

Aug. 17, 2022 (KR) ........................ 10-2022-0102970

(51) Int. Cl.
*H01J 61/16* (2006.01)
*H01J 61/32* (2006.01)
(Continued)

(52) U.S. Cl.
CPC ............ *H01J 61/16* (2013.01); *H01J 61/322* (2013.01); *H01J 61/523* (2013.01); *H01J 65/04* (2013.01)

(58) Field of Classification Search
CPC .................................. H01J 61/16; H01J 65/04
(Continued)

(56) References Cited

U.S. PATENT DOCUMENTS 5,757,130 A 5/1998 Dolan et al.
6,586,756 B1 * 7/2003 Kopperl .............. G01N 17/004 250/493.1
(Continued)

FOREIGN PATENT DOCUMENTS

CN 1510715 A 7/2004
JP 2001-004526 A 1/2001
(Continued)

OTHER PUBLICATIONS

Dong Ho Shin et al., "Manufacturing and Characteristics of the Electrodeless UV Lamp for Disinfection of the Sewage Effluent", J. Korean Ind. Eng. Chem., Aug. 2005, pp. 570-575, vol. 16, No. 4.
(Continued)

*Primary Examiner* — Christopher M Raabe
(74) *Attorney, Agent, or Firm* — Sughrue Mion, PLLC

(57) ABSTRACT

A light-emitting plasma lamp bulb for solar ultraviolet simulation includes a bulb cover having a spherical shape or a rod shape through which ultraviolet rays are transmittable, discharge gas contained in the bulb cover, and a first light-emitting material and a second light-emitting material, wherein the first light-emitting material includes at least one of mercury (Hg) and mercury iodide ($HgI_2$), and the second light-emitting material includes sulfur ($S_8$), wherein light emitted from the bulb has a maximum optical power intensity in a range of 395 to 455 nm which is an ultraviolet-visible boundary region, wherein, when compared using a same ultraviolet dose in an ultraviolet region of 290 to 400 nm, an integrated intensity of a visible and infrared region of 400 to 850 nm is equal to or less than ⅕ of an integrated intensity of a visible and infrared region of a standard solar spectrum (ASTM G173, AM 1.5G).

17 Claims, 6 Drawing Sheets

(51) Int. Cl.
*H01J 61/52* (2006.01)
*H01J 65/04* (2006.01)

(58) Field of Classification Search
USPC .......................................................... 313/571
See application file for complete search history.

(56) References Cited

U.S. PATENT DOCUMENTS

| | | | | |
|---|---|---|---|---|
| 6,734,630 | B1 | 5/2004 | Choi et al. | |
| 11,830,720 | B2 * | 11/2023 | March | G01N 1/44 |
| 2003/0168982 | A1 | 9/2003 | Kim | |
| 2004/0120147 | A1 | 6/2004 | Jeon et al. | |
| 2005/0092114 | A1 * | 5/2005 | Schonlein | G01N 17/00 73/866 |
| 2010/0301746 | A1 | 12/2010 | Koerber et al. | |
| 2015/0017731 | A1 | 1/2015 | Byun | |
| 2017/0170002 | A1 * | 6/2017 | Lee | H01J 61/125 |
| 2017/0203120 | A1 | 7/2017 | Kaas et al. | |
| 2022/0230868 | A1 | 7/2022 | March | |

FOREIGN PATENT DOCUMENTS

| | | | |
|---|---|---|---|
| JP | 2001222979 | A | 8/2001 |
| JP | 2008-216001 | A | 9/2008 |
| JP | 2014-038084 | A | 2/2014 |
| KR | 10-2006-0128511 | A | 12/2006 |
| KR | 10-1936946 | B1 | 1/2019 |
| WO | 2009/011510 | A1 | 1/2009 |

OTHER PUBLICATIONS

Ulrich Schulz, "Accelerated Testing", European Coatings Tech Files, Vincentz, pp. 119.

Kenichi Shimizu et al., "Weatherability of Polypropylene by Accelerated Weathering Tests and Outdoor Exposure Tests in Japan", Journal of Polymers, 2016, pp. 1-14, vol. 2016, Article ID 6539567, http://dx.doi.org/10.1155/2016/6539567.

British Office Action dated Feb. 9, 2024 in Application No. 2312550.3.

Communication dated Dec. 3, 2025 issued by the German Patent Office in application No. 102023122044.6.

* cited by examiner

LIGHT EMITTING PLASMA LAMP BULB FOR SOLAR UV SIMULATION AND LAMP COMPRISING THE SAME

TECHNICAL FIELD

The present disclosure relates to an electrodeless plasma lamp blub having solar ultraviolet (UV) simulation and a lamp including the same, and provides a technology in which a size and shape of a bulb cover constituting a bulb and a composition, content, and ratio of a light-emitting material included in the bulb cover are optimized to be suitable for simulating solar ultraviolet rays.

The present disclosure relates to a high-power electrodeless light-emitting plasma lamp bulb used in a solar ultraviolet generating device used to implement, in an indoor device, sunlight exposure, especially solar ultraviolet exposure, applied to most creatures on earth including humans and tools and products used by the humans.

BACKGROUND ART

Solar ultraviolet rays may be used as a sterilization device using natural light simulation for indoor laundry, and may be used as an auxiliary lighting device that enhances solar ultraviolet rays indoors and suntan for vitamin D production.

Also, solar ultraviolet rays may be used as an accelerated weathering test device for testing degradation by exposure to solar ultraviolet rays, and may be used as a light source for a photocuring device and a reaction device using a photochemical reaction.

In addition, solar ultraviolet rays may be used for an indoor greenhouse and an ecological environment creation device requiring solar ultraviolet lighting, and an aquarium for aquatic fish and plants.

In a conventional ultraviolet lamp, when mercury is sealed in a bulb filled with argon gas and thermoelectrons emitted from an electrode emit light through the argon gas, mercury gas emits ultraviolet rays having a discontinuous wavelength spectrum in an excited state. This is a common feature of most lamps emitting ultraviolet rays, such as a low-pressure mercury lamp, a metal-halide lamp, and an ultraviolet fluorescent lamp.

However, because solar ultraviolet rays have a continuous spectrum in which optical power increases from an ultraviolet region of 290 to 400 nm toward a long-wavelength, a discontinuous ultraviolet spectrum exhibited by conventional ultraviolet lamps using mercury as a light-emitting material is not suitable for simulating solar ultraviolet rays.

Existing ultraviolet lamps are mostly based on the principle of using light generated in a process of ionizing mercury vapor into an excited state by using arc discharge between electrodes, and use inert gas such as neon, argon, or xenon as an ionizing material for lighting assistance, in addition to mercury.

A high-pressure mercury lamp is a representative example of using emission characteristics due to ionization of mercury vapor. A lamp obtained by adding a halogen compound of a metal such as sodium, scandium, indium or thorium in order to improve luminous efficiency and color rendering is a metal-halide lamp.

An ultraviolet fluorescent lamp is also based on the principle of ultraviolet emission by ionization of inert gas and mercury gas between electrodes made of filaments.

As such, most ultraviolet lamps use ultraviolet rays generated during ionization of mercury gas due to arc discharge of electrodes, but due to the lack of simulation of an optical power spectrum of solar ultraviolet rays, an ultraviolet bulb technology capable of simulating only a solar ultraviolet region has not yet been completed.

Lamps currently used in an accelerated weathering test device for testing material degradation due to sunlight exposure include a xenon-arc lamp, a carbon-arc lamp, a metal-halide lamp, a high-pressure mercury lamp, and an ultraviolet fluorescent lamp. The xenon-arc lamp and the metal-halide lamp which have a high proportion of visible and infrared rays in addition to ultraviolet rays, are difficult to use as an ultraviolet lamp because the proportion of ultraviolet rays in an entire emission spectrum is low.

As such, a lamp in which the proportion of ultraviolet rays is low has low ultraviolet emission efficiency compared to output, and thus, is not suitable for applications requiring high-power solar ultraviolet rays. Accordingly, lamps having high ultraviolet emission efficiency are required, but conventional lamps having high ultraviolet emission efficiency such as a high-pressure mercury lamp, a carbon-arc lamp, an ultraviolet fluorescent lamp, and a metaling lamp still do not solve the lack of simulation of solar ultraviolet rays.

Electrodeless plasma light sources using high-frequency discharge are so-called "21st century lamps" with high power, high efficiency, and long lifetime, and since the first product was released by Fusionlighting in the United States in 1994, several domestic and foreign companies such as LG Electronics, Taewon Electronics, and Luxim have succeeded in commercializing lighting lamps having a continuous visible spectrum with high color rendering.

An electrodeless plasma light source uses sulfur, InBr, or CsBr as a main light-emitting material, and has emission characteristics of excellent color rendering centered on visible rays required for lighting without an ultraviolet component.

This contrasts with the fact that a xenon-arc lamp, which is considered as a lamp having the most excellent simulation in an entire solar spectrum, includes short-wavelength ultraviolet rays of 275 nm or less not included in sunlight.

Due to this feature, the light source that lights up the dark may artificially reproduce natural colors by sunlight, and unlike a xenon-arc lamp, and the advantage of being a white light source centered on visible rays with a low proportion of ultraviolet rays and infrared rays may be highlighted for lighting purposes.

However, because of the feature that an optical power spectrum is different from natural sunlight which includes ultraviolet rays and infrared rays in addition to visible rays, except for simple lighting applications, plasma lamps for lighting that have been developed so far do not have characteristics suitable for applications requiring sunlight simulation in an entire spectrum range as well as equipment applications that simulate solar ultraviolet rays.

That is, an electrodeless plasma lamp developed as a light source for lighting centered on visible rays is difficult to use as a light source for equipment requiring simulation of an entire spectrum of sunlight or a solar ultraviolet spectrum.

For example, representative examples of applications for simulating an entire spectrum of sunlight may include a light source for a test device such as a solar simulator for evaluating the performance of a solar cell or a solar simulation chamber for testing a solar radiation environment, and representative examples of applications requiring simulation of a spectrum of only a solar ultraviolet region may include an ultraviolet light source of an accelerated weathering test device.

Examples of applications of lamps for simulating solar ultraviolet rays may include various fields such as solar ultraviolet exposure necessary for the creation of a growing environment for animals and plants, a sterilization and medical device by ultraviolet rays, a production process facility using ultraviolet rays such as a curing device and an exposing device, and a photochemical reaction device light source such as $TiO_2$ photocatalyst activation in addition to light resistance and weathering tests on various materials such as plastic, solar cell materials, paints, pharmaceuticals, and cosmetics.

Artificial light sources for solar ultraviolet simulation that may be used for these purposes include a xenon-arc lamp, an ultraviolet fluorescent lamp, and a metal-halide lamp, and spectral spectra of these light sources are shown in FIGS. 1 and 2.

FIG. 1 illustrates a result obtained by comparing an ultraviolet-visible spectrum of outdoor sunlight with ultraviolet-visible spectra of a method (ISO 4892-2, method A) of testing by combining a daylight filter with a xenon-arc lamp that is a representative conventional photodegradation test method, an UVA 340 ultraviolet fluorescent lamp test method (ISO 4892-3, type IA) using an ultraviolet fluorescent lamp with a central peak wavelength of 340 nm, and an ultraviolet LED lamp with a central peak wavelength of 365 nm.

Referring to FIG. 1, the only artificial light source showing a solar-like optical power spectrum in a solar ultraviolet region of 290 to 400 nm is the xenon-arc light source, and even in this case, there is a big difference between 390 nm and 420 nm that is an ultraviolet-visible boundary region, and in particular, solar simulation is greatly degraded in an infrared region of 800 nm or more and the proportion of infrared rays acting as a radiant heat source increases.

Due to this problem of the xenon-arc light source with a high proportion of infrared rays, when an irradiation intensity of the xenon-arc lamp is increased, radiant heat is excessively transmitted, and thermal damage and thermal deformation of chemicals and chemical materials vulnerable to high-temperature exposure are caused, making it difficult to perform a test.

On the other hand, the ultraviolet fluorescent lamp and the ultraviolet LED lamp that emit only light in an ultraviolet region have the advantage of emitting only pure ultraviolet light not including visible and infrared rays as shown in FIG. 1 but have an important disadvantage of not simulating an optical power spectrum in an entire solar ultraviolet region.

Accordingly, the ultraviolet fluorescent lamp has a problem in that a long-wavelength ultraviolet region is excessively insufficient among light of a solar ultraviolet region, and the ultraviolet LED lamp has a problem in that emission characteristics are limited only to a narrow wavelength range and a short-wavelength ultraviolet region is excessively insufficient.

Because of these problems, these ultraviolet lamps have overall technical limitations in simulating natural degradation caused by actual solar ultraviolet rays, and in particular, are difficult to use when natural degradation has a sensitive dependence on ultraviolet wavelengths.

Also, the ultraviolet fluorescent lamp and the ultraviolet LED lamp have low power to be used as a light source for equipment that performs an accelerated weathering test of a sufficient area.

Accordingly, in addition to the disadvantage of having to use several lamps in order to use these low-power ultraviolet lamps for an accelerated weathering test, there is a problem that the lamps may not be applied to a super-accelerated test requiring a high irradiation intensity.

A technology derived from these problems of ultraviolet lamps is a metal-halide or metaling lamp as shown in FIG. 2.

FIG. 2 illustrates a result obtained by comparing an optical power spectrum of outdoor sunlight and an ultraviolet-visible spectrum of a metal-halide lamp using an optical filter for removing ultraviolet rays of 295 nm or less currently used in a super-accelerated weathering test device.

Unlike conventional ultraviolet fluorescent lamp and ultraviolet LED lamp, it is found that optical power of various wavelength is generated in a range of 295 to 400 nm, and some visible rays of 400 nm or more are also generated.

Although this lamp has the advantage of a high proportion of ultraviolet rays and thus is currently used in super-accelerated weathering test equipment using high ultraviolet irradiation intensity, this lamp has not overcome the lack of important optical power simulation for solar ultraviolet rays.

Referring to FIG. 2, it is found that the metal-halide lamp currently used in a super-accelerated weathering test has very poor solar ultraviolet simulation in a solar ultraviolet region of 295 to 400 nm as a feature of an optical power spectrum, despite the use of the optical filter.

This lamp was developed as a light source for a super-accelerated weathering test device because of the advantage of evenly generating optical power of various wavelengths in a solar ultraviolet region, but due to the lack of solar simulation of an optical power spectrum in the solar ultraviolet range, its use for a weathering test device is not generalized.

In the technical field related to an electrodeless plasma light source using high-frequency discharge, there is a case in which ultraviolet emission characteristics were obtained by using mercury, indium, gallium (J. Korean Ind. Eng. chem., Vol. 16, No. 4, August 2005, 570-575), zirconium iodide, or lanthanum iodide (Korean Patent Registration No. 10-0832396) as a main light-emitting material.

However, because this creates a discontinuous spectrum of a region different from solar ultraviolet simulation in a range of 290 to 400 nm, an ultraviolet wavelength range exceeds a solar ultraviolet region and there is no simulation of solar ultraviolet rays, and thus, it is difficult to use the light source as a light source for a weathering test.

DISCLOSURE

Technical Problem

The present disclosure is designed to solve the problems of the related art, and therefore the present disclosure is directed to providing an electrodeless plasma light source bulb using high-frequency discharge as a new bulb for solar ultraviolet simulation, in which simulation of a solar ultraviolet spectrum from 290 to 400 nm is very excellent while maintaining the advantages of an electrodeless plasma light source such as high power, high efficiency, and long lifetime, and the proportion of long-wavelength visible and infrared rays which are unnecessary in most ultraviolet lamp applications and are radiant heat sources that may cause thermal damage to chemical and biochemical materials vulnerable to heat is greatly reduced.

This is different from the characteristics of a light source used in a previous photodegradation test device technology (KR 10-1936946 B1) using an electrodeless plasma lamp that the proportion of visible and infrared rays is still high and the light source is difficult to classify as an ultraviolet lamp.

FIG. 3 illustrates a result obtained by comparing a standard solar spectrum corresponding to AM 1.5G defined in the US ASTM G173 standard with optical power spectra of plasma lamps of Conventional Technology (KR 10-1936946 B1) and Example 1 of the present disclosure.

It is found that Conventional Technology shows a continuous spectrum in which optical power increases from a short-wavelength toward a long-wavelength, like sunlight, in a solar ultraviolet region of 290 to 400 nm, but contains strong visible rays as much as sunlight in a visible region of 400 to 650 nm.

Accordingly, the light source of Conventional Technology may be classified as a white light source centered on visible rays including solar ultraviolet rays, and because of this feature, the light source may not be classified as a light source for ultraviolet rays.

Compared to Conventional Technology in which power is lower than solar power at 650 nm or more, it is found that, in the present disclosure, optical power is rapidly lowered from an ultraviolet-visible boundary of 410 nm or more and no significant optical power is generated at 800 nm or more.

Because of this feature, according to the present disclosure, dramatic reduction in optical power of a visible and infrared region which has not been sufficiently achieved by Conventional Technology is achieved.

Also, because the present disclosure shows a spectrum in which a characteristic optical power drop in a 325 to 340 nm region applied in Conventional Technology is removed, solar ultraviolet simulation may be further improved.

However, because the present disclosure may show a higher level of optical power than solar ultraviolet rays in a region of 270 to 320 nm when an ultraviolet blocking filter is not used, the present disclosure may reduce or block optical power in a region (270 to 320 nm) by using a daylight filter used to simulate sunlight in a xenon-arc lamp or a metal-halide lamp.

Also, one of technologies of the present disclosure that Conventional Technology may not provide is an ultraviolet light output provided per lamp.

Because the lamp used in Conventional Technology was a relatively low-power plasma lamp that used power of 0.5 kW or less and was a light source with a still high proportion of visible rays, the amount of ultraviolet light that may be obtained with one lamp was even more insufficient, and thus, there was a difficulty in using 4 to 8 lamps in one device at the same time.

In Conventional Technology, because it was inevitable to use an optical path and a rod-type concentration device because of insufficient optical power, and it should be satisfied with testing a small irradiation area of 31 $cm^2$ per lamp, it was difficult to apply to a general accelerated weathering test in which multiple specimens are tested simultaneously.

However, the present disclosure may be applied to a lamp using a power consumption of at least 1 kW or more, and may be optimally used for a lamp using a power consumption ranging from 1.5 kW to 6 kW.

In addition, because the present disclosure greatly reduces the proportion of visible and infrared rays compared to Conventional Technology and dramatically increases the proportion of ultraviolet rays to increase the amount of ultraviolet rays compared to resulting light output, when the present disclosure is applied to a high-power lamp of 5 kW or more, ultraviolet rays corresponding to 300-400 nm may be irradiated to an irradiation area of 2,500 $cm^2$ at 600 $W/m^2$ or more.

This area corresponds to 80 times an irradiation area of 31 $cm^2$ irradiated by one lamp of Conventional Technology, and it means that when specimens of the same size are used, up to 80 specimens may be simultaneously tested with one lamp unlike Conventional Technology in which one specimen is tested per lamp.

Also, the present disclosure provides an ultraviolet bulb for an electrodeless plasma light source having excellent solar ultraviolet simulation, which includes a control technology for keeping a surface temperature of a bulb cover stable by air cooling to prevent flickering or shaking of light during development and to prevent thermal deformation of a quartz bulb.

Technical Solution

In one aspect of the present disclosure, there is provided an indoor solar ultraviolet simulation test device of the following embodiments.

According to a first embodiment, there is provided a light-emitting plasma lamp bulb for solar ultraviolet simulation, including, a bulb cover having a spherical shape or a rod shape through which ultraviolet rays are transmittable, discharge gas contained in the bulb cover, and a first light-emitting material and a second light-emitting material, wherein the first light-emitting material includes at least one of mercury (Hg) and mercury iodide ($HgI_2$), and the second light-emitting material includes sulfur ($S_8$), wherein light emitted from the bulb has a maximum optical power intensity in a range of 395 to 455 nm which is an ultraviolet-visible boundary region, wherein, when compared using a same ultraviolet dose in an ultraviolet region of 290 to 400 nm, an integrated intensity of a visible and infrared region of 400 to 850 nm is equal to or less than ⅕ of an integrated intensity of a visible and infrared region of a standard solar spectrum (ASTM G173, AM 1.5G).

According to a second embodiment, in the first embodiment, an inner diameter of the bulb cover may be within a range of 30 to 50 mm.

According to a third embodiment, in the first or second embodiment, a content of the second light-emitting material per volume of the bulb cover may range from 0.05 to 0.5 $mg/cm^3$.

According to a fourth embodiment, in any one of the first to third embodiments, a content of the at least one of the mercury and the mercury iodide included in the first light-emitting material may be 10 to 30 times a content of sulfur based on a weight ratio.

According to a fifth embodiment, in any one of the first to fourth embodiments, the light-emitting plasma lamp bulb for solar ultraviolet simulation may ionize a light-emitting material with high-power high-frequency energy having a power consumption of 1 kW or more to emit light simulating solar ultraviolet rays of a continuous spectrum in an excited state in plasma.

According to a sixth embodiment, in any one of the first to fifth embodiments, the light-emitting plasma lamp bulb for solar ultraviolet simulation may apply a daylight filter that blocks short-wavelength ultraviolet rays of 300 nm or less so that, based on an integrated area ($W/m^2$) of a solar ultraviolet wavelength range, a region of 290 to 320 nm is adjusted within a range of 2.6 to 7.9%, a region of 320 to 360 nm is adjusted within a range of 28.2 to 39.8%, and a region of 360 to 400 nm is adjusted within a range of 54.2 to 67.5%.

According to a seventh embodiment, in any one of the first to sixth embodiments, the light-emitting plasma lamp bulb for solar ultraviolet simulation may have a maximum value in 395 to 455 nm which is an ultraviolet-visible boundary region, and a ratio of an integrated irradiation intensity of an infrared region of 800 to 2,450 nm may be 5% or less with respect to an integrated irradiation intensity of an ultraviolet and visible region of 800 nm or less.

According to an eighth embodiment, in any one of the first to seventh embodiments, when the mercury and the mercury iodide are used as a mixture, a mixing ratio of the mercury and the mercury iodide may range from 1:0.2 to 1:5.

According to a ninth embodiment, in any one of the first to eighth embodiments, the discharge gas may be at least one gas material from among neon, argon, krypton, and xenon gas.

According to a tenth embodiment, in any one of the first to ninth embodiments, the discharge gas may be contained at a charging pressure of 5 to 300 torr.

According to an eleventh embodiment, in any one of the first to tenth embodiments, the bulb cover may be formed of quartz or synthetic quartz.

According to a twelfth embodiment, there is provided a light-emitting plasma lamp for solar ultraviolet simulation including the light-emitting plasma lamp bulb for solar ultraviolet simulation according to any one of the first to eleventh embodiments.

According to a thirteenth embodiment, in the twelfth embodiment, the light-emitting plasma lamp for solar ultraviolet simulation may include a lamp module designed to maintain an outer surface temperature of the light-emitting plasma lamp bulb for solar ultraviolet simulation at 900° C. or less.

According to a fourteenth embodiment, in the thirteenth embodiment, the lamp module may include an air-cooled cooling device in which local blowing and exhausting to a bulb surface is performed through a gap between a bulb cover connecting rod and a plasma lamp waveguide or a gap designed in a reflector surrounding the bulb to maintain a surface temperature of the light-emitting plasma lamp bulb for solar ultraviolet simulation at 900° C. or less.

According to a fifteenth embodiment, in the thirteenth embodiment or the fourteenth embodiment, the lamp module may include a thermometer or a temperature sensor for measuring or detecting a temperature of an outer surface of the bulb to control the temperature of the outer surface of the bulb and perform an emergency stop function of cutting off lamp power except for a cooling device when abnormality occurs in temperature control.

According to a sixteenth embodiment, in any one of the twelfth to fifteenth embodiments, the light-emitting plasma lamp for solar ultraviolet simulation may be applied to a high-power light-emitting plasma lamp having a power consumption of 1 kW or more and 6 kW or less.

According to a seventeenth embodiment, in any one of the twelfth to sixteenth embodiments, the light-emitting plasma lamp for solar ultraviolet simulation may be applied to a sterilization device using solar ultraviolet simulation, an optical and inspection device for ultraviolet fluorescence, a chemical reaction and resin curing device using an ultraviolet photoreaction, a photodegradation test device by solar ultraviolet rays, a device for creating a growing environment for animals, plants, and microorganisms, and a health or medical device for vitamin D production.

Advantageous Effects

According to an embodiment of the present disclosure, there may be provided a solar ultraviolet simulation test light source and device which may predict and evaluate, in a short time, a change in a chemical material over time due to long-term photodegradation caused by solar ultraviolet rays.

In detail, regarding a weathering test device of a conventional xenon-arc light source method, a number of international standards have proposed testing with an irradiation intensity of 60 $W/m^2$ in a solar ultraviolet wavelength range of 290 to 400 nm (ISO-4892-2, Method A), and even in the case of equipment designed to exhibit relatively high acceleration, an ultraviolet irradiation intensity of up to 180 $W/m^2$ is applied as a maximum value based on an ultraviolet wavelength range of 290 to 400 nm due to concerns about thermal damage occurring on a surface of a specimen. In comparison, according to an embodiment of the present disclosure, an accelerated photodegradation test using uniform ultraviolet irradiation to an entire specimen portion to which multiple specimens are applied may be provided with a test temperature controllable up to an irradiation intensity of 1,200 $W/m^2$ or more based on an ultraviolet wavelength range of 290 to 400 nm.

A radiant heat control effect according to an ultraviolet irradiation intensity of each of a solar ultraviolet simulation test device of Embodiment and a xenon-arc weathering test device according to conventional technology was evaluated with a black panel thermometer and a result is shown in FIG. 4.

It is found that as an ultraviolet irradiation intensity of a light source used in each test device increases, a surface temperature of the black panel thermometer (BPT, ° C.) located at a light receiving portion of a specimen increases, and it is also found that, in particular, in the test device of the xenon-arc light source of the conventional technology, because a black panel temperature very rapidly rises according to an increase in the ultraviolet irradiation intensity, although the ultraviolet irradiation intensity may be greatly increased to improve acceleration, the test device is not applicable to many chemical and biochemical materials that are subject to thermal damage by high-temperature radiant heat.

For example, polyethylene, one of the most commonly used plastics has a thermal deformation temperature of about 85° C. As shown in FIG. 4, an accelerated weathering test using the xenon-arc lamp using a high irradiation intensity at a normal test temperature may not be applied due to thermal deformation of a specimen during the test.

Although attempts may be made to greatly lower an ambient test temperature below an existing temperature condition, for example, to about a sub-zero temperature, in order to offset radiant heat generated by the high irradiation intensity, these attempts do not match real conditions, and thus, an unrealistic test result is obtained.

However, it is found that the solar ultraviolet test device (Example 1) of the present disclosure is capable of temperature control so that an accelerated photodegradation test on a chemical material without thermal damage even at a very high ultraviolet irradiation intensity level is performed (see FIG. 4).

Although a specimen temperature control effect by controlling an ambient air temperature may be more conveniently achieved by extremely reducing an irradiation area or the number of specimens as in Conventional Technology (KR 10-1936946 B1), this may not be applied to a commercial test requiring a relatively large number of specimens or irradiation area.

Because acceleration compared to field degradation of a weathering test using a conventional xenon-arc lamp or ultraviolet fluorescent lamp is not high, a long test time is required, from as short as 1,000 hours to as long as more than 10,000 hours, in order to predict and evaluate a change in a chemical material and product in an outdoor environment over several years or decades.

For example, when the amount of ultraviolet exposure for 10 years is calculated as 3,000 MJ/$m^2$ for a product installed facing south in a temperate climate region, a total test time required for an ultraviolet irradiation intensity test of 60 W/$m^2$ using the lamp of the conventional weathering device is about 14,000 hours (580 days) despite the continuous test.

When the ultraviolet lamp for solar ultraviolet simulation according to the present disclosure is used, a test may be performed with an ultraviolet irradiation intensity of 600 W/$m^2$ without fear of thermal damage to a specimen, and thus, a test with the amount of ultraviolet exposure of 3,000 MJ/$m^2$ may be performed in 1,400 hours, reducing the test time to 1/10.

Although a conventional ultraviolet lamp, that is, an ultraviolet fluorescent lamp, a metal-halide lamp, or a high-pressure mercury lamp, may increase an irradiation intensity without fear of thermal damage to a specimen, a weathering test device using the conventional ultraviolet lamp greatly lacks simulation of an optical power spectrum for solar ultraviolet rays and lacks realistic simulation of photodegradation of a chemical material, so the use of the conventional ultraviolet lamp is limited to applications where realistic simulation is not important.

However, according to an embodiment of the present disclosure, when the light source of the present disclosure having a light source spectrum with enhanced solar ultraviolet simulation is used, a high ultraviolet irradiation intensity may be used without fear of thermal damage even when an ultraviolet irradiation intensity is increased for an accelerated photodegradation test, and thus, a test time may be reduced, actual degradation behavior may be realistically reproduced by exhibiting characteristics optimized for photodegradation, and excellent realistic simulation and accelerated acceleration in the photodegradation test of a chemical material which may not be achieved with the conventional technology may be achieved.

In particular, since various optical filters used in the conventional technology may be applied to a solar ultraviolet simulation bulb and a plasma lamp using the same according to the present disclosure, an additional ultraviolet control effect may be achieved by applying a daylight filter and various ultraviolet blocking filter applied to the conventional technology based on realistic simulation of an optical power spectrum for solar ultraviolet rays provided by the present disclosure.

According to the present disclosure, in the conventional technology, a lamp capable of providing ultraviolet rays with a high irradiation intensity in a sufficiently large device having a commercially effective irradiation area is limited to a high-power metal-halide lamp.

However, as described above, because an existing high-power ultraviolet lamp such as a metal-halide lacks simulation for solar ultraviolet rays and may not simulate solar ultraviolet rays in all wavelengths of a solar ultraviolet region even when an optical filter for partially blocking ultraviolet rays is used, the existing high-power ultraviolet lamp is not suitable for applications that strictly reproduce solar photodegradation.

Accordingly, the solar ultraviolet simulation test light source and device according to an embodiment of the present disclosure may provide a high-power ultraviolet light amount capable of simultaneously testing several specimens with one lamp like the conventional xenon-arc lamp and the metal-halide lamp used in a commercial photodegradation test device.

The characteristics of the solar ultraviolet simulation light source according to an embodiment of the disclosure provide excellent technical and economic advantages over any solar simulation light source used in a conventional weathering test device.

Because a light source spectrum formed by using a common daylight filter for blocking ultraviolet rays of 300 nm or less in the bulb of the present disclosure is highly consistent with an ultraviolet region of a solar light source spectrum, the light source spectrum may satisfy upper and lower limits of a solar ultraviolet simulation optical power spectrum distribution specified in Table 1 of ISO 4892-2 which was implemented only by a combination of a xenon light source and a daylight filter.

Also, while an emission lifetime of a xenon-arc lamp that simulates an entire solar wavelength band, an ultraviolet fluorescent lamp that mainly emits ultraviolet rays, and a metal-halide lamp is only 500 to 1,500 hours, the solar ultraviolet simulation bulb according to an embodiment of the present disclosure provides the same characteristics of an electrodeless plasma lamp having a lifetime of at least 5,000 hours as life characteristics of other electrodeless plasma lamps.

Because an electrodeless plasma lamp bulb generally has an emission lifetime of 10,000 hours or more, device operation may be stable and the cost of replacing the bulb according to device operation may be greatly reduced.

According to an embodiment of the present disclosure, a plasma lamp bulb that provides high-power ultraviolet rays with high simulation of a solar ultraviolet optical power spectrum according to the features of the present disclosure may provide, to an effective irradiation area, ultraviolet rays with a high irradiation intensity that may exert a super-acceleration effect, which may not be achieved by a conventional accelerated weathering test device.

According to the present disclosure, because there may be provided a solar ultraviolet simulation bulb which may greatly improve acceleration compared to a conventional weathering test technology by providing high-intensity ultraviolet irradiation to a specimen without thermal deformation or thermal damage and a plasma light source device using the bulb, the features and effects of the present disclosure have been demonstrated.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

An objective of the present disclosure is to provide a high-power ultraviolet bulb that may be used for applications in which it is desirable to include as little visible and infrared rays as possible in an industrial device, product, and facility requiring solar ultraviolet rays.

In detail, the bulb of the present disclosure may realistically reproduce photodegradation of a chemical material because a light source spectrum formed by using a common daylight filter for blocking ultraviolet rays of 300 nm or less matches an ultraviolet region of a solar light source spectrum, and may greatly reduce visible and infrared rays which act as radiant heat sources and may enable an accelerated photodegradation test with high acceleration while minimizing thermal damage caused by radiant heat that may be generated in a test specimen even when a high ultraviolet irradiation intensity is used.

Also, while conventional technology (KR 101303691 B1) has a small irradiation area of about 31 $cm^2$ where one lamp has to test one small specimen, the present technology has commercial effectiveness capable of irradiating high-intensity ultraviolet rays corresponding to 600 $W/m^2$ (based on 300 to 400 nm integrated intensity) to an irradiation area of 2,500 $cm^2$, which is up to 80 times that of the conventional technology.

Unlike an actual sunlight irradiation environment, a conventional test method (SAE J1960/2527, ASTM G155 Cy.7), which allows some short-wavelength sunlight of 300 nm or less lacks realistic simulation because of a filter system that allows some short-wavelength ultraviolet rays not included in sunlight, and solar ultraviolet simulation is important in an accelerated weathering test (Accelerated Testing, Ulrich Schulz, European Coatings Tech Files, pp.119).

For this reason, when a xenon-arc lamp is used, in order to improve solar ultraviolet simulation, recent attempts have been made to use a special daylight filter for more strictly simulating solar ultraviolet rays (ASTM D7869:2013) or use a new light source having high solar ultraviolet simulation (10-1303691).

Figure 3:
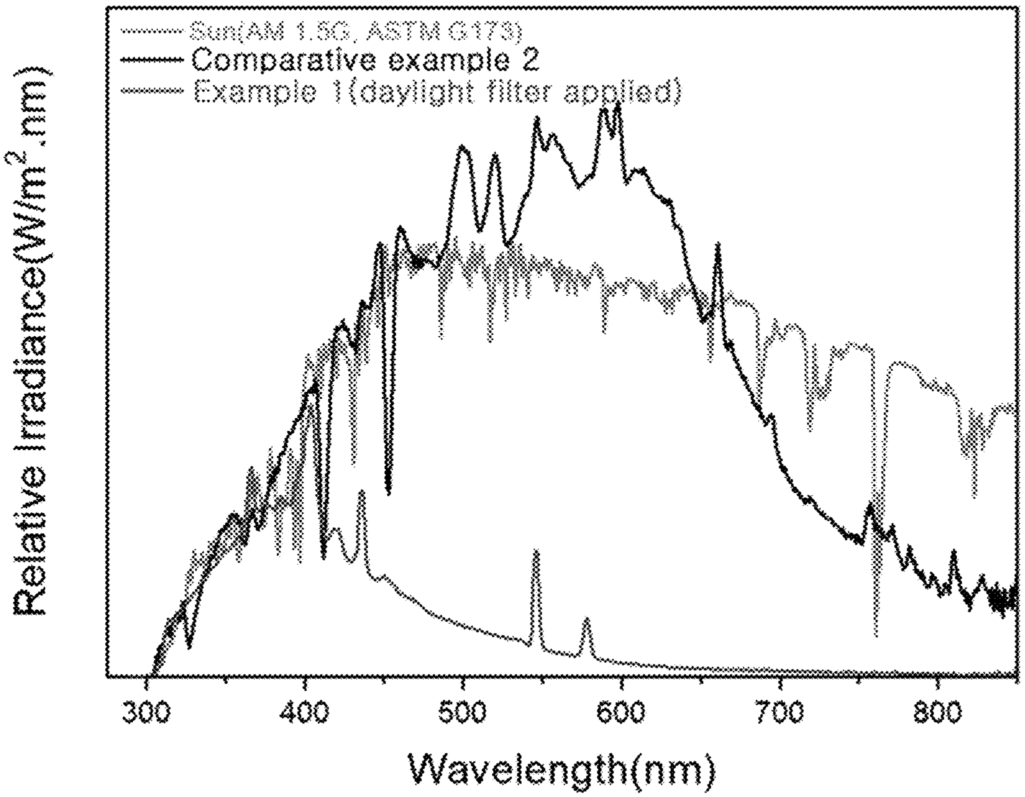
FIG. 3 is a graph illustrating a result obtained by comparing optical power spectra of sunlight and a light-emitting plasma lamp of conventional technology, and an optical power spectrum of an embodiment of the present disclosure.

FIG. 3 illustrates a result obtained by comparing a solar optical power spectrum with an optical power spectrum of an electrodeless plasma lamp provided by the present inventors in the conventional invention (Korean Patent Registration No. 10-1303691), and it is found that the conventional technology has optical power spectrum simulation in a solar ultraviolet wavelength region of 290 to 400 nm and optical power of long-wavelength visible and infrared rays is lower than that of sunlight.

Due to this feature, even when an ultraviolet irradiation intensity is increased, because an irradiation intensity of corresponding long-wavelength visible and infrared rays is less increased than that of sunlight and a xenon-arc lamp, thermal damage and thermal deformation of a chemical material which occur at a high irradiation intensity test may be avoided.

Accordingly, lamp characteristics of the present disclosure that the proportion of visible and infrared rays is less than that of ultraviolet rays are lamp characteristics corresponding to a requirement of a super-acceleration test technology to improve test acceleration by increasing an irradiation intensity.

However, the optical power spectrum of the conventional invention (10-1303691) of FIG. 3 shows a higher proportion of ultraviolet rays compared to visible and infrared rays than the sunlight and xenon-arc lamp, but still has a large proportion of visible rays, and thus, the optical power spectrum does not reach an ultraviolet lamp for desirable solar ultraviolet simulation.

Also, another problem of the conventional technology is a sharp discontinuous dip in a spectrum in a range of 290 to 400 nm that is a solar ultraviolet wavelength region, which impairs solar simulation.

Such a deep dip occurring at 320 to 340 nm is a unique characteristic of a plasma lamp used in the conventional technology, thereby greatly impairing simulation of an optical power spectrum of natural sunlight.

Accordingly, the light source may cause a significant error in simulating solar ultraviolet rays in photodegradation and photochemical reaction of a chemical component having a sensitive wavelength dependence in a wavelength region of 320 to 340 nm.

Light, heat, and moisture exposure are main causes of degradation in photodegradation over time in which a chemical material such as plastic is exposed to an outdoor environment for a long time, and among them, a component corresponding to an ultraviolet wavelength region of sunlight is known to be the most likely factor causing physical property degradation.

Accordingly, matching characteristics of a light source for an accelerated test for simulating an outdoor environment with characteristics of solar ultraviolet rays is the most important factor in the accelerated photodegradation test for the outdoor environment.

Because a chemical material has a unique ultraviolet-visible (UV-VIS) absorption spectrum according to its molecular structure and characteristics of photodegradation corresponding to an ultraviolet light source vary according to each ultraviolet absorption characteristics, only an accelerated resistance test using an artificial light source matching an optical power spectrum given in a use environment may reproduce the same photodegradation result.

This is because an activation spectrum according to the overlap between ultraviolet absorption characteristics of a corresponding chemical material and an optical power spectrum of sunlight determines actual photodegradation characteristics.

An artificial light source having an ultraviolet spectrum not matching the optical power spectrum of sunlight creates an activation spectrum not matching photodegradation given in an actual use environment, causing an error not following an actual degradation mechanism.

Although there may be several reasons for photodegradation behavior mismatch of a conventional artificial light source for a test (e.g., a carbon-arc lamp, an ultraviolet fluorescent lamp, a metal-halide lamp, or a xenon-arc lamp) used to simulate photodegradation and an ultraviolet optical power spectrum of an actual light source causing photodegradation of a chemical material in a use environment, among them, the most important factor is mismatch of a degradation mechanism occurring when an ultraviolet optical power spectrum of a light source used in a test device and an optical power spectrum of solar ultraviolet rays do not match each other.

In sterilization, a curing device, an exposure device, and activation of a photocatalytic material, when it is technically important to simulate a solar ultraviolet environment, such solar ultraviolet simulation is required without exception.

This principle applies not only to the field of an accelerated weathering test for a chemical material but also to artificial sunbathing, reptile breeding, plant growth, and various sterilization which require solar ultraviolet simulation.

As another degradation factor, one of factors determining long-term degradation of a chemical material in an actual use environment is the influence of heat. Because it is known that heat and light including ultraviolet rays have a mutual synergistic effect in determining a mechanism and speed of degradation of a chemical material over time, an accelerated weathering test which may ensure actual degradation reproducibility should consider not only solar ultraviolet simulation of an ultraviolet optical spectrum but also the influence of radiant heat generated from a lamp on test temperature control.

Testers using a xenon-arc lamp which are recognized for their solar ultraviolet simulation, as representative conventional accelerated weathering testers, may have difficulty in controlling test temperature by radiant heat due to a relatively high amount of infrared rays generated by a light source.

Although an accelerated weathering test method that increases an ultraviolet irradiation intensity is receiving technical attention as part of a super-accelerated test method for reducing a weathering test period, when an ultraviolet irradiation intensity is increased by using a xenon-arc lamp, heat generated by the lamp is accumulated in an internal space in a given tester, and as a result, it is very difficult to control a temperature of a high light intensity test.

Even when an internal temperature of a device is lowered through a cooling device to solve this problem, a temperature of a specimen surface may rise to a high temperature at which thermal damage occurs due to radiant heat directly radiated from the lamp, and thus, the test technology of the xenon-arc lamp that irradiates high-intensity ultraviolet rays has a technical limitation due to a rise in radiant heat.

Accordingly, the conventional accelerated weathering tester using the xenon-arc lamp has been difficult to apply high-intensity ultraviolet rays for super-acceleration, and on the contrary, the ultraviolet fluorescent lamp and the metal-halide lamp in which the proportion of ultraviolet rays is high have lacked solar ultraviolet simulation.

Table 1 shows an ultraviolet spectrum distribution for each region of sunlight and conventional technology, and a numerical value is an integrated irradiation intensity in %.

TABLE 1

| | Sunlight (ASTM G173) | Example 1[1)] | Comparative Example 1[2)] | Comparative Example 2[3)] | Comparative Example 3[4)] | Comparative Example 4[5)] |
|---|---|---|---|---|---|---|
| Division | | LEP1 | Xe | 10-1303691 | UVA340 | Metalling |
| ISO 4892-2 Conformity[Table 2)] | | Suitable | Suitable | Suitable | Unsuitable | Unsuitable |
| UV/VIS(%)[6)] | 7.8 | 83.5 | 10.5 | 8.8 | 700.3 | 77.7 |

1) Electrodeless light-emitting plasma lamp using bulb of the present disclosure
2) ISO 4892-2, Method A, xenon-arc lamp using daylight filter
3) Electrodeless light-emitting plasma lamp of conventional invention (Korean Patent 1303691)
4) Representative ultraviolet fluorescent lamp (UVA 340)
5) Metal-halide lamp using 295 nm blocking filter
6) $\Sigma$(290-400 nm)X100/$\Sigma$(400-850 nm)

Table 2 shows a result obtained by comparing upper and lower limits of a solar ultraviolet component specified in ISO 4892-2 Table 1 with Example 1, and Comparative Examples 1 to 4 (integrated irradiation intensity, %).

TABLE 2

| Region (nm) | Lower limit | Upper limit | Example 1 | Comparative Example 1 | Comparative Example 2 | Comparative Example 3 | Comparative Example 4 |
|---|---|---|---|---|---|---|---|
| λ < 290 | 0 | 0.15 | 0.10 | 0.01 | 0.10 | 0.10 | 0.15 |
| 290 ≤ λ ≤ 320 | 2.6 | 7.9 | 5.9 | 5.4 | 6.9 | 8.0 | 6.1 |
| 320 ≤ λ ≤ 360 | 28.2 | 39.8 | 33.7 | 38.2 | 31.9 | 63.9 | 26.8 |
| 360 ≤ λ ≤ 400 | 54.2 | 67.5 | 60.3 | 56.4 | 59.2 | 27.8 | 66.9 |

Because the xenon-arc lamp has a low proportion of ultraviolet rays in an entire optical power spectrum distributed in ultraviolet-visible-infrared rays, when light of the entire optical power spectrum is emitted at a high intensity to increase an irradiation intensity, excessive radiant heat may be transmitted to a surface of a specimen, and chemical and biochemical materials that are vulnerable to heat may suffer thermal damage due to undesired thermal deformation or thermal degradation.

When an optical filter that transmits ultraviolet rays and selectively blocks visible and infrared rays is used to avoid this problem, radiant heat directly irradiated to the specimen surface may be reduced, but optical power spectrum characteristics of an ultraviolet region may be distorted due to the use of a specific band-pass filter, and because a temperature rise in a device due to the radiant heat blocked by the filter is inevitable, difficulty in controlling a test temperature is fundamentally difficult to avoid.

On the other hand, an accelerated weathering tester using the ultraviolet fluorescent lamp may avoid thermal damage caused by high-intensity radiant heat because light of a visible and infrared wavelength region is not included in emitted light, but it is difficult to emit high-power light due to the nature of the fluorescent lamp and it is difficult to apply high-intensity ultraviolet rays to a test due to morphological characteristics of the lamp in which the lamp is long and thus emission characteristics are structurally distributed.

heat caused by high intensity irradiation should be sufficiently lowered while having simulation in a solar ultraviolet region.

The features of the present disclosure that sunlight simulation in an entire solar ultraviolet region is satisfied and solar ultraviolet irradiation with a high irradiation intensity is expected without fear of thermal damage even by high-intensity light irradiation by lowering the proportion of visible and infrared rays as much as possible may be applied to various fields such as sterilization, curing and exposure, and photochemical reaction by solar ultraviolet exposure as well as improving acceleration of a weathering test.

A solar ultraviolet simulation light source according to an aspect of the present disclosure is a solar ultraviolet simulation light source in which a radiant heat source in a visible and infrared region is reduced, and when an irradiation intensity of 340 nm in an optical power spectrum distribution table of the light source is normalized to 1 and an irradiation intensity of 340 nm in an optical power spectrum of sunlight based on ASTM G173 is also normalized to 1, a root mean square deviation of an interval of 1 nm in an ultraviolet region from 290 to 400 nm is 0.26 (solar ultraviolet simulation) close to 0.20 of a xenon-arc lamp using a special daylight filter. Table 3 shows a result obtained by comparing solar ultraviolet simulation (root mean square deviation compared to natural sunlight) of a spectrum provided by the light source of the present disclosure and spectra of conventional inventions.

TABLE 3

| | Example 1 | Comparative Example 1 | Comparative Example 2 | Comparative Example 3 | Comparative Example 4 |
|---|---|---|---|---|---|
| Division | LEP1 | Xe | Conventional invention (10-1303691) | UVA340 | Metalling |
| Root mean square deviation [1)] | 0.26 | 0.20 | 0.37 | 0.64 | 1.33 |

However, a more fundamental problem of the ultraviolet fluorescent lamp is that the lamp may not simulate an entire solar ultraviolet wavelength band of 290 to 400 nm and thus has a limitation in solar ultraviolet simulation.

Figure 1:
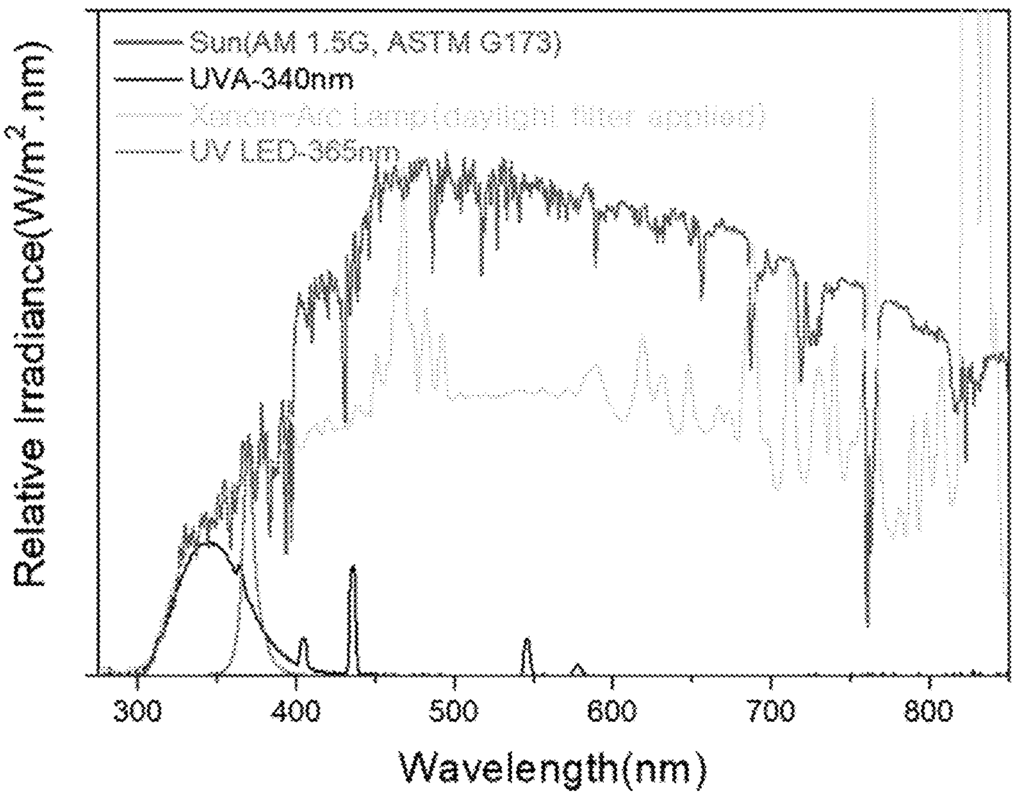
FIG. 1 is a graph illustrating a result obtained by comparing optical power spectra of sunlight and conventional weathering test light source technology.
Figure 2:
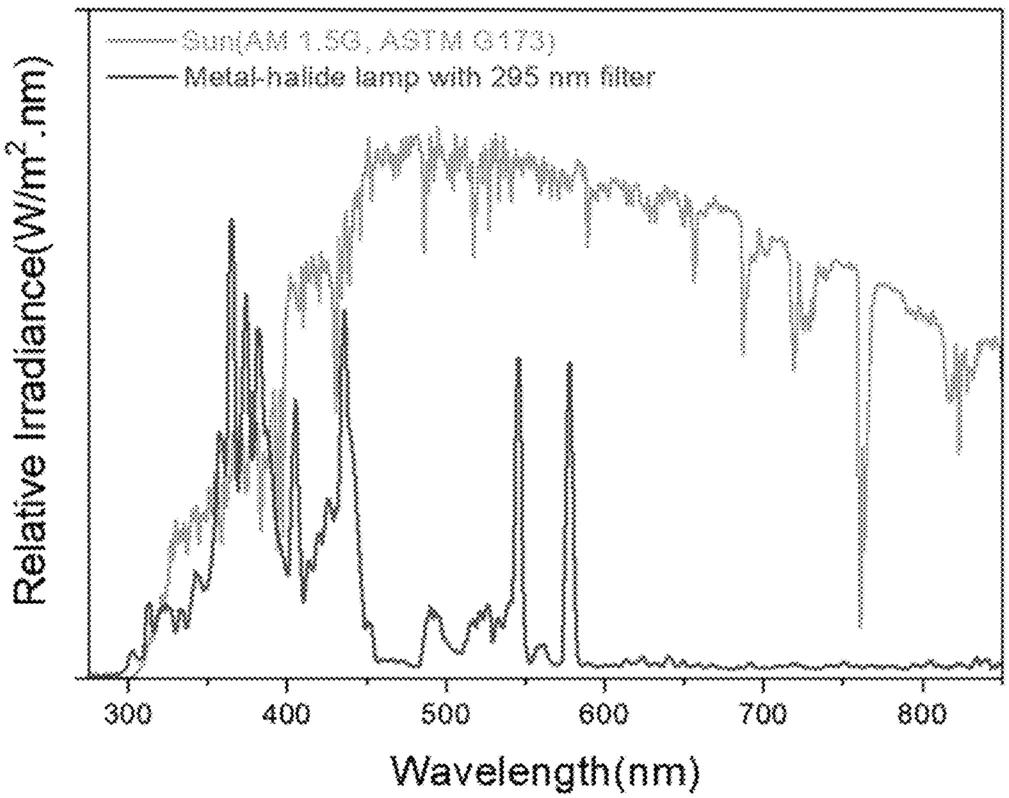
FIG. 2 is a graph illustrating a result obtained by comparing optical power spectra of sunlight and conventional super-accelerated weathering test light source technology.

As in an example of the UVA340 lamp of FIG. 1, because the ultraviolet fluorescent lamp emits only an ultraviolet optical power spectrum of a narrow wavelength band with a maximum value at 313 nm, 340 nm, and 351 nm and thus may not simulate an entire solar ultraviolet wavelength band, the lamp may not reproduce many photodegradation mechanisms sensitive to ultraviolet wavelengths like in actual natural degradation.

Accordingly, the conventional light sources for weathering tests do not satisfy requirements of a solar ultraviolet light source necessary for a super-accelerated photodegradation test that the proportion of visible and infrared rays which cause thermal damage to a test material due to radiant 1) Root mean square deviation calculation formula, $$\mathrm{RMS}D = \sqrt{\frac{\sum_{j=1}^{n}(x_{1f} - x_{2f})^2}{n}}$$

Also, in the solar ultraviolet simulation light source of the present disclosure, when a total sum of integrated irradiation intensities of ultraviolet rays of 400 nm or less is 100%, the proportion of an integrated irradiation intensity of a region of less than 290 nm is 0.15% or less, the proportion of an integrated irradiation intensity of a region of 290 nm or more and less than 320 nm is 2.6% or more and 7.9% or less, the proportion of an integrated irradiation intensity of a region of 320 nm or more and less than 360 nm is 28.2% or more and 39.8% or less, and the proportion of an integrated irradiation intensity of a region of 360 nm or more and less than 400 nm is 54.2% or more and 67.5% or less, and thus, the lamp satisfies upper and lower limits of the international standard (ISO 4892-2:2013) that stipulates simulation of a spectral distribution of a solar ultraviolet spectrum.

In addition, the solar ultraviolet simulation light source of the present disclosure is a solar ultraviolet simulation light source in which, even without the use of an optical filter for blocking visible and infrared rays, when using the same ultraviolet dose, an integrated intensity of a visible and infrared region of 400 to 850 nm is equal to or less than ⅕ of an integrated intensity of a visible and infrared region of a standard solar spectrum (ASTM G173, AM 1.5G), and in a typical case, less than 11%, and thus, a radiant heat source is specially reduced.

A plasma lamp of the present disclosure is a solar ultraviolet simulation light source in which a radiant heat source of a visible and infrared region is reduced, and because the plasma lamp of the present disclosure uses an electrodeless light-emitting plasma lamp that emits light by exciting a light-emitting material into a plasma state with high-frequency discharge, the plasma lamp belongs to the category of technology applied to an electrodeless plasma lamp of the conventional technology.

Accordingly, discharge gas used in the electrodeless plasma lamp of the conventional technology, that is, neon, argon, krypton, and xenon gas may be used, and in particular, argon and xenon gas may be used as a discharge gas material.

However, according to the present disclosure, because a first light-emitting material includes at least one of mercury (Hg) and mercury iodide ($HgI_2$) and a second light-emitting material includes a small amount of sulfur, the present disclosure may generate a unique ultraviolet spectrum different from an emission spectrum of the conventional plasma lamp using mercury and sulfur.

This ultraviolet spectrum is not a spectrum that may be expected by simply mixing an optical power spectrum produced by the conventional plasma lamp using mercury and sulfur as light-emitting materials, and in order to achieve excellent solar ultraviolet simulation of the present disclosure, a composition ratio of light-emitting materials provided by the present disclosure should be satisfied.

Hereinafter, conditions for a light-emitting material composition provided by the present disclosure will be described in detail.

According to the present disclosure, a first light-emitting material includes at least one of mercury (Hg) and mercury iodide ($HgI_2$). According to an embodiment of the present disclosure, the content of the at least one of mercury (Hg) and mercury iodide ($HgI_2$) included in the first light-emitting material may be 10 to 30 times, or 10 to 20 times, or 12.5 to 18 times, or 10 to 12.5 times, or 12.5 to 30 times the content of sulfur used in the second light-emitting material based on a weight ratio.

A small amount of sulfur used as the second light-emitting material may cause a short-wavelength ultraviolet spectrum outside a solar ultraviolet range generated by mercury or a mixture of mercury and mercury iodide used as the first light-emitting material to be shifted to a solar ultraviolet range, and a discontinuous spectrum to be changed into a continuous spectrum such as solar ultraviolet rays.

Also, according to an embodiment of the present disclosure, the content of the first light-emitting material injected into a bulb may be 10 to 30 times the content of sulfur that is the second light-emitting material. Within this content range provided by the present disclosure, various effects may be obtained in light emission stability, visible and infrared exclusion, and control of a surface temperature of a bulb cover.

In detail, according to an embodiment of the present disclosure, a bulb cover to be applied to an electrodeless plasma lamp set using high-power high-frequency discharge of 1 kW or more may be provided in a spherical or rod shape having an inner diameter of 30 to 50 mm. Discharge gas such as argon gas and xenon gas and the first light-emitting material and the second light-emitting material may be injected together as a light-emitting material in the bulb cover.

The first light-emitting material may include at least one of mercury and mercury iodide.

The content of the first light-emitting material is linked to the content of the second light-emitting material, and a change in a spectrum shape, an irradiation intensity, and a bulb surface temperature depend on a change in a content ratio of the first and second light-emitting materials.

Also, when mercury and mercury iodide are used together as the first light-emitting material, optimal conditions for adjusting a spectral shape of an ultraviolet region and stabilizing emission characteristics of the bulb may be provided according to a mixing ratio of the mercury and the mercury iodide.

According to an embodiment of the present disclosure, the mixing ratio of the mercury and the mercury iodide may be 1:0.2 to 1:5.0, or 1:0.2 to 1:3.0, or 1:1 to 1:2.5, or 1:1.5 to 2.33, or 1:0.2 to 1:2.33, or 1:2.33 to 1:5.0 based on a weight ratio.

When a ratio of mercury iodide to mercury increases, because long-wavelength shift occurs in an entire spectrum shape and an ultraviolet wavelength at which emission begins may move toward a longer wavelength, short-wavelength ultraviolet rays of 290 nm or less that are not included in solar ultraviolet rays may be reduced but the overall proportion of ultraviolet rays may decrease and the proportion of visible rays may increase. Accordingly, the bulb having an optimized spectrum may be manufactured through unique mixing ratio control provided by the present disclosure.

When a mixing ratio is less than this mixing ratio, the mixing effect of mercury iodide may be insufficient, and when a mixing ratio exceeds this mixing ratio, a spectral shape similar to that when mercury iodide is used alone may be obtained.

The second light-emitting material may include sulfur, and according to an embodiment of the present disclosure, the second light-emitting material may be sulfur. When the amount of sulfur is equal to or greater than 1/30 of the input amount of mercury and mercury iodide which are the first light-emitting material based on a weight ratio, a band-shaped discontinuous spectrum generated by mercury and mercury iodide may be changed into a continuous spectrum such as solar ultraviolet rays. Also, when the amount of sulfur is equal to or less than 1/10 of the input amount of mercury and mercury iodide which are the first light-emitting material based on a weight ratio, visible light-centered emission characteristics of a sulfur plasma lamp may be suppressed and ultraviolet emission characteristics with high solar ultraviolet simulation may be achieved.

As such, according to an embodiment of the present disclosure, there may be provided a new high-power electrodeless plasma ultraviolet lamp bulb for solar ultraviolet simulation in which spectrum simulation for solar ultraviolet rays in a range of 290 to 400 nm is excellent by optimizing the composition, content, and mixing ratio of the first light-emitting material and the second light-emitting material and the proportion of visible and infrared rays which are radiant heat sources which may cause thermal damage of a test material at a high irradiation intensity is much lower than that in the conventional technology.

Figure 5:
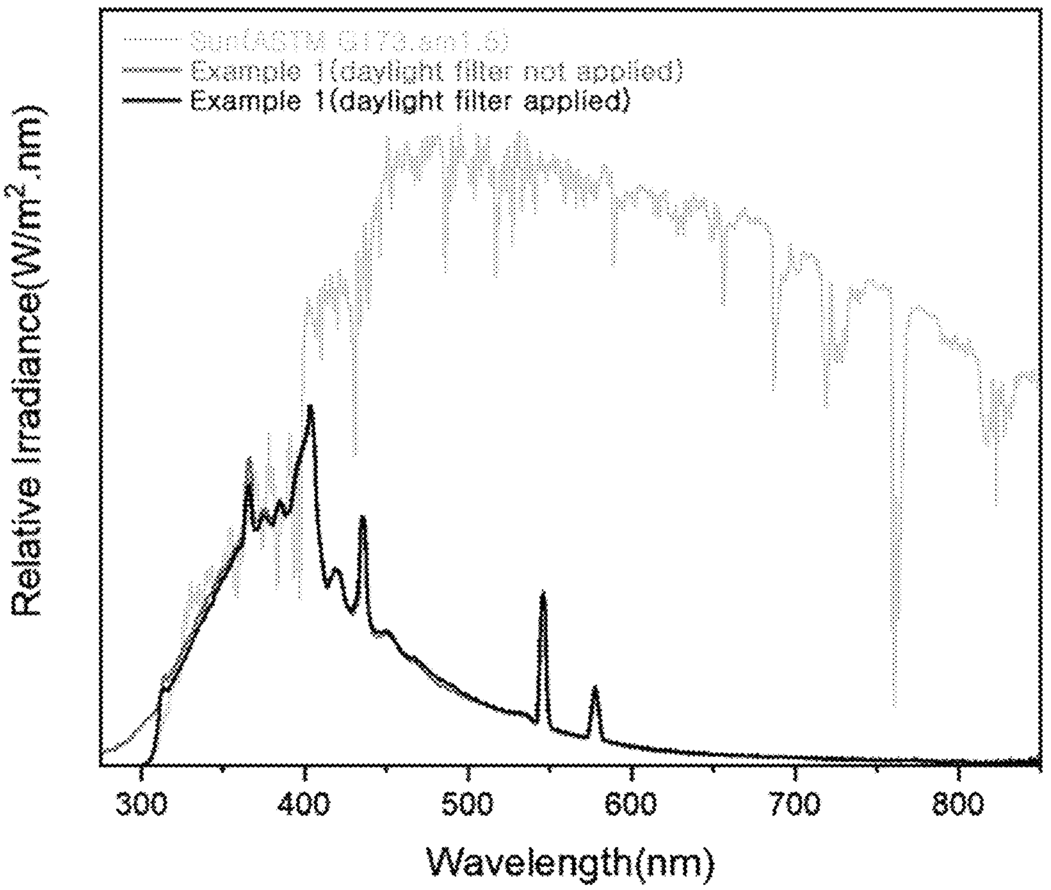
FIG. 5 is a graph illustrating a result obtained by comparing a spectrum of an embodiment of the present disclosure with a solar optical power spectrum.

FIG. 5 illustrates a result obtained by comparing a standard optical power spectrum of sunlight (red solid line) with optical power spectra (blue and green solid lines) of electrodeless plasma lamps according to whether to use a solar ultraviolet simulation bulb of the present disclosure and a daylight filter for blocking ultraviolet rays of 300 nm or less.

Because a plasma lamp spectrum provided by the solar ultraviolet simulation bulb provided by the present disclosure displayed in blue in FIG. 5 includes short-wavelength ultraviolet rays of 300 nm or less, the lamp may easily provide a solar ultraviolet simulation spectrum of the present disclosure displayed in green by using a commonly used daylight filter (filter for blocking an ultraviolet wavelength of 300 nm or less).

A green optical power spectrum using a daylight filter of the present disclosure shows simulation similar to solar ultraviolet simulation of a xenon-arc lamp using a daylight filter known to have excellent solar ultraviolet simulation in a solar ultraviolet region of 290 to 40 nm.

As shown in Table 1, while a ratio of ultraviolet rays of 290 to 400 nm in an optical power spectrum of a standard sunlight of FIG. 3 is 7.8% with respect to the spectral integration area of visible rays and some infrared rays in a range of 400 to 850 nm, and a ratio of ultraviolet rays of the conventional invention is 8.8%, a ratio of ultraviolet rays in an optical power spectrum using a daylight filter according to the present disclosures is as high as 83.5% based on the same standard.

In other words, when the same amount of ultraviolet rays is irradiated, the solar ultraviolet simulation bulb of the present disclosure receives only a small amount of visible rays corresponding to about 11% of sunlight.

Also, because the solar ultraviolet simulation bulb of the present disclosure hardly contains light in an infrared wavelength range exceeding 850 nm, when a wavelength range is extended to an infrared ray range, a ratio of ultraviolet irradiation to sunlight of the solar ultraviolet simulation bulb is further increased.

The solar ultraviolet simulation bulb of the present disclosure in which the proportion of visible and infrared rays that are simultaneously received is not increased even when a high dose of ultraviolet rays is irradiated may be applied to a high-power lamp and may perform optimized performance for applications in which super-accelerated weathering and light resistance tests of irradiating a relatively high level of ultraviolet rays are performed.

In the case of sunlight and a xenon-arc light source that simulates sunlight, when a high level of ultraviolet rays is irradiated, a reception level of visible and infrared rays also increases, thereby causing thermal damage and thermal deformation of a specimen due to radiant heat.

Due to this problem, black or dark plastics having high radiant energy absorption in general-purpose plastics having a relatively low thermal deformation temperature such as polyethylene and ABS may not be applied to an accelerated weathering test using an ultraviolet dose of 180 $W/m^2$ (3-Sun) or more based on an ultraviolet integration area of 290 to 400 nm with the conventional technology.

When a condition of excessively cooling a specimen surface is used in order to avoid thermal deformation, there is a problem that photodegradation like in an actual outdoor field may not be reproduced (Reference Document: Journal of Polymers, Vol. 2016, Article ID 6539567, 14 pages, 2016).

According to an aspect of the present disclosure, there is provided a light-emitting plasma lamp for solar ultraviolet simulation including the light-emitting plasma lamp bulb for solar ultraviolet simulation according to an embodiment of the present disclosure described above.

According to the plasma lamp using the solar ultraviolet simulation bulb provided by the present disclosure, it is found that, compared to a natural solar spectrum, a spectrum intensity of a visible and infrared region is significantly lowered, which is not an effect obtained through a filter for blocking visible and infrared rays but is due to emission characteristics of the bulb itself.

Due to the effect of the present disclosure, the electrodeless plasma lamp of the present disclosure provides a solar ultraviolet simulation bulb that may be applied to a high-power electrodeless plasma lamp for high-intensity ultraviolet irradiation of 1 kW or more, which was not provided by the conventional technology.

The electrodeless plasma lamp using the ultraviolet bulb provided by the present disclosure may provide an ultraviolet bulb that may be applied to an electrodeless plasma lamp using high-power high-frequency discharge of 1 kW or more by providing characteristics suitable for luminous stability without flickering or shaking of light and temperature control of a surface of a quartz bulb without thermal deformation.

The light-emitting plasma lamp for solar ultraviolet simulation may include a lamp module designed to maintain an outer surface temperature of the light-emitting plasma lamp for solar ultraviolet simulation at 900° C. or less.

The lamp module may include an air-cooled cooling device in which local blowing and exhausting to a surface of the bulb is performed through a gap between a bulb cover connection rod and a plasma lamp waveguide or a gap between designed in a reflector surrounding the bulb to maintain a surface temperature of the light-emitting plasma lamp bulb for solar ultraviolet simulation at 900° C. or less.

Figure 6:
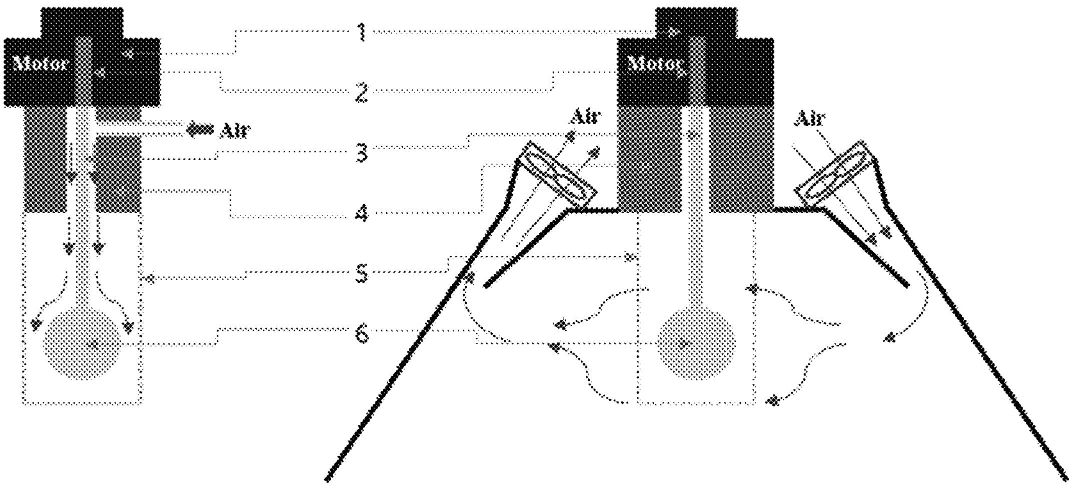
FIG. 6 is a schematic view illustrating an air-cooled structural design of a lamp module that may be used in a light-emitting plasma lamp for solar ultraviolet simulation, according to an embodiment of the present disclosure.

FIG. 6 is a schematic view illustrating an air-cooled structure design of a lamp module that may be used in a light-emitting plasma lamp for solar ultraviolet simulation according to an embodiment of the present disclosure, particularly illustrating an air-cooled structure design of a lamp module for cooling a surface temperature of a bulb cover to a specific temperature (900° C.) or less.

Referring to FIG. 6, a light-emitting plasma lamp for solar ultraviolet simulation according to an embodiment of the present disclosure may include a bulb cover 6, a bulb rod 3 for fixing the bulb cover 6, a high-frequency waveguide 4 in which the bulb rod 3 is provided, and a bulb rotation shaft connection screw 2 for connecting the high-frequency waveguide 4 and a bulb rotation motor 1. In this case, an air-cooled cooling method may be used to allow air to flow toward the bulb cover 6 with a forced blowing device in a connection gap between the bulb rod 3 and the high-frequency waveguide 4, or to allow cooling air to flow around the bulb by forming a gap for blowing and exhausting in a reflector provided around the bulb. Also, a metal mesh 5 surrounding an outer surface of the bulb cover 6 may be further provided.

The lamp module includes a thermometer or a temperature sensor that measures or detects a temperature of an outer surface of the bulb to control the temperature of the outer surface of the bulb and perform an emergency stop function of cutting off power of the lamp except for a cooling device when abnormality occurs in temperature control.

The light-emitting plasma lamp for solar ultraviolet simulation may be applied to a high-power light-emitting plasma lamp of 1 kW or more and 6 kW or less based on power consumption.

According to an embodiment of the present disclosure, the light-emitting plasma lamp for solar ultraviolet simulation may be applied to a sterilization device using solar ultraviolet simulation, an optical and inspection device for ultraviolet fluorescence, a chemical reaction and resin curing device using an ultraviolet photoreaction, a photodegradation test device by solar ultraviolet rays, a device for creating a growing environment for animals, plants, and microorganisms, and a health or medical device for vitamin D production.

A process of manufacturing the ultraviolet bulb provided according to the present disclosure will be described in detail, but this is merely an example to help understand an implementation method of the present disclosure and the essential features of the present disclosure are not based on the manufacturing process.

A bulb cover material used to manufacture the ultraviolet bulb provided by the present disclosure is quartz glass for an ultraviolet lamp, and in a more specific example, the bulb cover material is quartz glass whose thickness is 2 mm and whose light transmittance measured in an ultraviolet wavelength band of 300 to 400 nm ranges from (91-94)%, and is heat-resistant quartz glass having a highest temperature of 1100° C. or more for continuous use. In this case, high-purity quartz with a water content (based on OH group) of 30 ppm or less is preferred.

There may be various methods of forming a bulb cover. For example, a bulb cover may be formed by melting a part of a tube-shaped quartz tube with heat into a sphere suitable for a size of a bulb and connecting one side with a non-hollow rod and the other side with a hollow thin tube.

A bulb may be manufactured by injecting a measured light-emitting material through a tube hole on one side of the bulb cover, charging discharge gas such as argon and xenon at a pressure of 5 to 300 torr, removing the connected tube, and trimming and sealing it into a spherical or rod shape.

A size of the tube used at this time depends on a size of the bulb cover that is finally manufactured. For example, in order to manufacture a bulb cover having a diameter in a range of 36 to 50 mm, a tube having an inner diameter of 30 to 38 mm and an outer diameter of 32 to 40 mm may be suitably used.

A size of a quartz tube that may be most suitably used may be an inner diameter of 32 to 36 mm and an outer diameter of 34 to 38 mm, and in this case, the quartz tube may be more desirably used.

However, the tube size may be preferred differently depending on material characteristics of glass used to manufacture the bulb cover, process characteristics of a manufacturing device, and processing conditions of an operator, and thus, does not limit the technical characteristics of the present disclosure.

In detail, a method of manufacturing a light-emitting plasma lamp for solar ultraviolet simulation of Example 1 which is an embodiment of the present disclosure described above is as follows.

A bulb cover material used to manufacture the light-emitting plasma lamp bulb for solar ultraviolet simulation of Example 1 was a high-purity quartz whose thickness is 2 mm, light transmittance measured in an ultraviolet wavelength band of 300 to 400 nm ranges from 91 to 94%, highest temperature for continuous use is 1,100° C., and water content (based on OH group) is 30 ppm or less.

A bulb cover may be manufactured by melting a part of a tube-shaped quartz tube with heat into a sphere suitable a size of a bulb so that one side is connected with a non-hollow rod and the other side is connected with a hollow thin tube. In this case, a diameter of the bulb cover was 40 mm, and in this case, the tube used to manufacture the spherical bulb cover had an inner diameter of 34 mm and an outer diameter of 36 mm.

15 mg and 35 mg of mercury and mercury iodide were respectively prepared as a first light-emitting material, and 4 mg of sulfur was prepared as a second light-emitting material.

A light-emitting plasma lamp bulb for solar ultraviolet simulation was manufactured by injecting the first light-emitting material and the second light-emitting material through a tube hole on one side of the bulb cover, charging discharge gas such as argon at a pressure of 30 torr, removing the connected tube, and trimming and sealing it into a spherical or rod shape.

Figure 4:
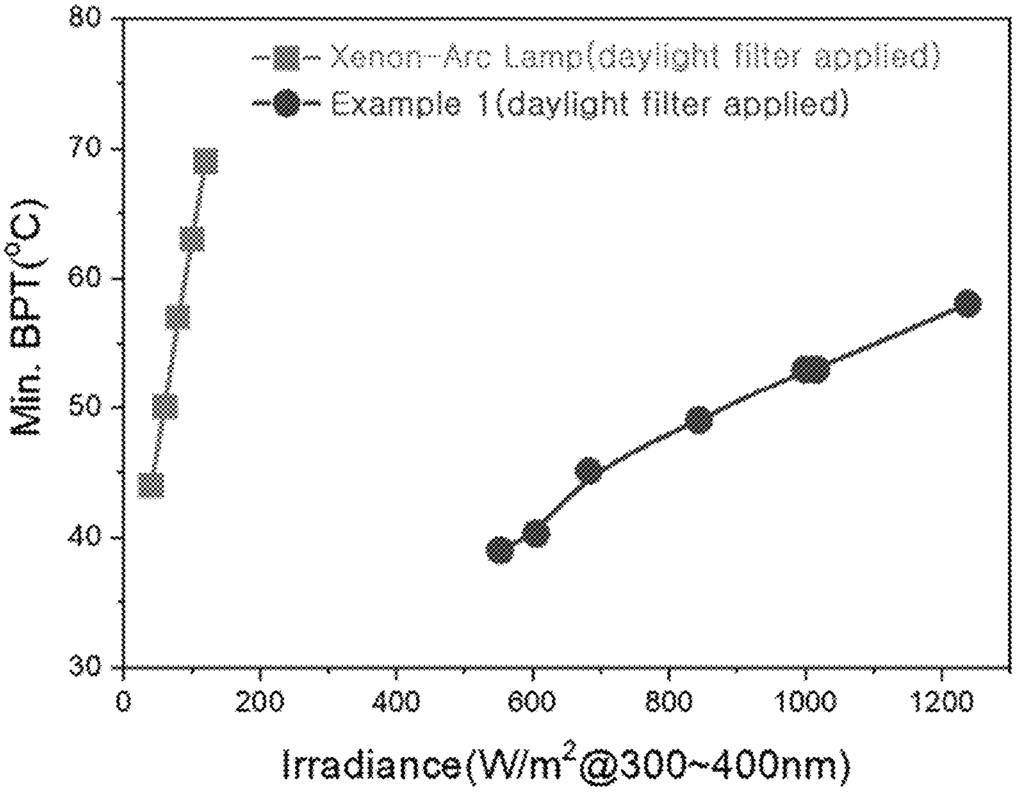
FIG. 4 is a graph illustrating a result obtained by comparing test temperature control effects (radiation temperature of a black panel thermometer) of an embodiment of the present disclosure and conventional technology.

In this case, the manufactured light-emitting plasma lamp bulb for solar ultraviolet simulation was used as it is without an additional filter (e.g., a daylight filter), or was used by applying a daylight filter (manufacturer: Optronics, Product name: 300 nm cut off LPF) that blocks ultraviolet rays of 300 nm or less to the manufactured light-emitting plasma lamp bulb for solar ultraviolet simulation. In this case, the lamp of Example 1 to which the additional filter is not applied is referred to as "Example 1 (daylight filter not applied)", and the lamp of Example 1 to which the daylight filter is applied is referred to as "Example 1 (daylight filter applied)", as shown in FIGS. 3 to 5.

What is claimed is:

1. A light-emitting plasma lamp bulb for solar ultraviolet simulation, comprising:

a bulb cover having a spherical shape or a rod shape through which ultraviolet rays are transmittable; discharge gas contained in the bulb cover; and a first light-emitting material and a second light-emitting material, wherein the first light-emitting material comprises at least one of mercury (Hg) and mercury iodide ($HgI_2$), and the second light-emitting material comprises sulfur ($S_8$), wherein light emitted from the bulb has a maximum optical power intensity in a range of 395 to 455 nm which is an ultraviolet-visible boundary region, wherein, when compared using a same ultraviolet dose in an ultraviolet region of 290 to 400 nm, an integrated intensity of a visible and infrared region of 400 to 850 nm is equal to or less than ⅕ of an integrated intensity of a visible and infrared region of a standard solar spectrum (ASTM G173, AM 1.5G).

2. The light-emitting plasma lamp bulb for solar ultraviolet simulation according to claim 1, wherein an inner diameter of the bulb cover is within a range of 30 to 50 mm.

3. The light-emitting plasma lamp bulb for solar ultraviolet simulation according to claim 1, wherein a content of the second light-emitting material per volume of the bulb cover ranges from 0.05 to 0.5 mg/cm$^3$.

4. The light-emitting plasma lamp bulb for solar ultraviolet simulation according to claim 1, wherein a content of the at least one of the mercury and the mercury iodide included in the first light-emitting material is 10 to 30 times a content of sulfur based on a weight ratio.

5. The light-emitting plasma lamp bulb for solar ultraviolet simulation according to claim 1, wherein the light-emitting plasma lamp bulb for solar ultraviolet simulation ionizes a light-emitting material with high-power high-frequency energy having a power consumption of 1 kW or more to emit light simulating solar ultraviolet rays of a continuous spectrum in an excited state in plasma.

6. The light-emitting plasma lamp bulb for solar ultraviolet simulation according to claim 1, wherein the light-emitting plasma lamp bulb for solar ultraviolet simulation applies a daylight filter that blocks short-wavelength ultraviolet rays of 300 nm or less so that, based on an integrated area ($W/m^2$) of a solar ultraviolet wavelength range, a region of 290 to 320 nm is adjusted within a range of 2.6 to 7.9%, a region of 320 to 360 nm is adjusted within a range of 28.2 to 39.8%, and a region of 360 to 400 nm is adjusted within a range of 54.2 to 67.5%.

7. The light-emitting plasma lamp bulb for solar ultraviolet simulation according to claim 1, wherein the light-emitting plasma lamp bulb for solar ultraviolet simulation has a maximum value in 395 to 455 nm which is an ultraviolet-visible boundary region, and a ratio of an integrated irradiation intensity of an infrared region of 800 to 2,450 nm is 5% or less with respect to an integrated irradiation intensity of an ultraviolet and visible region of 800 nm or less.

8. The light-emitting plasma lamp bulb for solar ultraviolet simulation according to claim 1, wherein, when the mercury and the mercury iodide are used as a mixture, a mixing ratio of the mercury and the mercury iodide ranges from 1:0.2 to 1:5.

9. The light-emitting plasma lamp bulb for solar ultraviolet simulation according to claim 1, wherein the discharge gas is at least one gas material from among neon, argon, krypton, and xenon gas.

10. The light-emitting plasma lamp bulb for solar ultraviolet simulation according to claim 1, wherein the discharge gas is contained at a charging pressure of 5 to 300 torr.

11. The light-emitting plasma lamp bulb for solar ultraviolet simulation according to claim 1, wherein the bulb cover is formed of quartz or synthetic quartz.

12. A light-emitting plasma lamp for solar ultraviolet simulation comprising the light-emitting plasma lamp bulb for solar ultraviolet simulation according to claim 1.

13. The light-emitting plasma lamp for solar ultraviolet simulation according to claim 12, wherein the light-emitting plasma lamp for solar ultraviolet simulation comprises a lamp module designed to maintain an outer surface temperature of the light-emitting plasma lamp bulb for solar ultraviolet simulation at 900° C. or less.

14. The light-emitting plasma lamp for solar ultraviolet simulation according to claim 13, wherein the lamp module comprises an air-cooled cooling device in which local blowing and exhausting to a bulb surface is performed through a gap between a bulb cover connecting rod and a plasma lamp waveguide or a gap designed in a reflector surrounding the bulb to maintain a surface temperature of the light-emitting plasma lamp bulb for solar ultraviolet simulation at 900° C. or less.

15. The light-emitting plasma lamp for solar ultraviolet simulation according to claim 13, wherein the lamp module comprises a thermometer or a temperature sensor for measuring or detecting a temperature of an outer surface of the bulb to control the temperature of the outer surface of the bulb and perform an emergency stop function of cutting off lamp power except for a cooling device when abnormality occurs in temperature control.

16. The light-emitting plasma lamp for solar ultraviolet simulation according to claim 12, wherein the light-emitting plasma lamp for solar ultraviolet simulation is applied to a high-power light-emitting plasma lamp having a power consumption of 1 kW or more and 6 kW or less.

17. The light-emitting plasma lamp for solar ultraviolet simulation according to claim 12, wherein the light-emitting plasma lamp for solar ultraviolet simulation is applied to a sterilization device using solar ultraviolet simulation, an optical and inspection device for ultraviolet fluorescence, a chemical reaction and resin curing device using an ultraviolet photoreaction, a photodegradation test device by solar ultraviolet rays, a device for creating a growing environment for animals, plants, and microorganisms, and a health or medical device for vitamin D production.

* * * * *